United States Patent [19]
Mahaney et al.

[11] Patent Number: 5,917,391
[45] Date of Patent: Jun. 29, 1999

[54] TRANSIENT VOLTAGE SURGE SUPPRESSOR HAVING A SWITCH WITH OVERTRAVEL PROTECTION

[75] Inventors: John Mahaney, Williamstown; Patrick J. Murphy, Marcellus, both of N.Y.

[73] Assignee: Pass & Seymour, Inc., Syracuse, N.Y.

[21] Appl. No.: 09/046,461

[22] Filed: Mar. 23, 1998

[51] Int. Cl.⁶ .................................................. H01M 73/00
[52] U.S. Cl. .............................................. 335/18; 335/17
[58] Field of Search ..................... 335/18, 17; 361/42–51

[56] References Cited

U.S. PATENT DOCUMENTS

| | | | |
|---|---|---|---|
| 4,630,015 | 12/1986 | Gernhardt et al. | 335/18 |
| 4,802,052 | 1/1989 | Brant et al. | 361/42 |
| 4,872,081 | 10/1989 | Murphy et al. | |
| 5,179,491 | 1/1993 | Runyan | 361/45 |
| 5,594,398 | 1/1997 | Marcou et al. | 335/18 |

*Primary Examiner*—Lincoln Donovan
*Attorney, Agent, or Firm*—Bond, Schoeneck & King, LLP; Stephen B. Salai

[57] ABSTRACT

A transient voltage surge suppressor (TVSS) receptacle having front and rear matable casings including a plurality of through openings for receiving the blades of an electrical plug; an electrical circuit within the receptacle having at least one element adapted to clamp high transient voltages imposed thereon to a lower level; an alarm electrically connected to the at least one element for indicating the failure of the at least one element; and a switch connected to the alarm for disabling the alarm, is described. The switch includes a moveable on-off element and a generally U-shaped, metal switch blade having a first leg for contacting the moveable element; a second leg for contacting a contact of the alarm in response to travel of the first leg caused by the moveable element, the second leg; an integral U-shaped portion connecting the first and the second legs; and a non-linear intermediate portion in the second leg extending toward the first leg for absorbing over-travel of the switch blade.

7 Claims, 9 Drawing Sheets

TRANSIENT VOLTAGE SURGE SUPPRESSOR HAVING A SWITCH WITH OVERTRAVEL PROTECTION

FIELD OF THE INVENTION

This invention relates generally to a transient voltage surge suppressor (TVSS) receptacle having a switch with overtravel protection, and more specifically to a switch blade with an integral over-travel stop for absorbing over-travel and preventing permanent deformation of the switch blade when the switch blade is used in conjunction with a reversible on-off switch of the receptacle.

BACKGROUND OF THE INVENTION

In order to provide complete suppression of voltage transients in electrical circuits, and particularly circuits that include hot, neutral, and ground conductors, it is desirable to provide surge suppression utilizing such components as metal oxide varistors, bridging each of three possible pairs of conductors in which these voltage transients can occur. More specifically, it is desirable to provide a surge protection device connected between the hot and ground lines, between the hot and neutral lines and between the neutral and ground lines.

Some forms of TVSS devices, such as varistors, are subject to failure during operation, either as a result of high energy transient voltages being applied to the devices, the repetitive application of low energy transient voltages being applied to the devices, or even the long term application of steady state voltages above the suppression threshold. Such varistors are subject to failure as a result of thermal or chemical breakdown of the components of the varistor. Any of these may lead to immediate varistor failure.

As the varistor fails or begins to fail, it's surface can begin to break down, become conductive and cause short-circuiting with other conductive parts of the TVSS product. As a result, the electronic components and other metal components must be shielded from each other and/or separated by distances large enough to prevent short circuiting and premature failure of the device. Such separation distances may limit the size and number of components that can be used in a receptacle with conventional dimensions.

The failure mode associated with metal oxide varistors, produces a short circuit or low impedance failure. That is, the impedance of the device is reduced significantly below its normal operating impedance, as a result of failure. It is known to protect electrical circuits against such failure, by providing fuses in series with the varistors so that if the varistors fail, the fuses open and the varistor does not itself cause a short circuit or low impedance condition on the power circuit, which could create a risk of overloading the circuit, leading to overheating, the tripping of remote circuit breakers, or the like.

When a metal oxide varistor fails in a way that causes a series connected fuse to open, the protection provided by the varistor is lost. Moreover, the failure may be undetectable by observation of the devices connected to the circuit. Therefore it is possible for the transient voltage protection to be lost without any obvious signs thereof, and thereafter for voltage transients to be passed unsuppressed to the equipment connected to the previously protected circuit, possibly causing damage.

In an effort to provide some indication of the failure of certain suppression devices, particularly varistors, indicators have been provided. Such indicators may be visual, such as a light emitting diode or other visible device; or audible such as a buzzer, horn or the like.

While audible failure indicators are particularly desirable in applications where the TVSS device is mounted in a visually inaccessible area, an audible alarm can itself cause problems. In applications where a fault occurs and an audible alarm sounds, it may be some time before a repair can be effected. Since surge suppression devices are often combined with electrical receptacles which are permanently connected to electrical circuits, trained personnel are needed to effect a replacement in the event of a fault.

In residential settings, or even commercial or industrial settings, a trained person is not always immediately available. In these cases, the incessant buzzing of an audible alarm may be distressing to residents forced to listen to it during the time it takes for the device to be replaced. Since a control for deactivating a buzzer must be accessible on the outside of the device, it may happen that the control is either accidentally or even maliciously engaged before a fault occurs, thereby in some instances rendering the audible portion of the alarm ineffective in the event of a failure. It would be advantageous to provide a control for disengaging an audible alarm that can be switched from an engaged position to a disengaged position repeatedly, so that if the alarm is accidentally disengaged before a fault occurs, the device is not thereby rendered inoperative in the future. It is desirable to do this switching electrically rather than mechanically, so as to provide repeatable engagement and disengagement without damage as may occur with a mechanical approach.

Known switches having metal contacts which are repeatedly engaged and disengaged may suffer from metal fatigue and permanent deformation due to over travel of the metal switch blade. This may result in decreased reliability and ultimate failure of the switch.

It is another more specific object of the invention to provide a TVSS switch with increased reliability having a switch blade with an integral stop for preventing overtravel of the switch blade and preventing permanent deformation of the switch blade.

SUMMARY OF THE INVENTION

The transient voltage surge suppressor of the invention includes front and rear casing members configured for mating engagement to provide an enclosed housing. The disclosed and preferred embodiment is that of a duplex receptacle having two sets of openings in the front wall for receiving the blades or prongs of male plugs connected to the receptacle. The usual female receptacle contacts are positioned within the housing in registration with the blade-receiving openings, and are connected to line terminal and ground buses, each having portions accessible on the exterior of the housing for connection thereto of incoming electrical leads and grounding means.

Voltage surge protection is provided in all three modes, i.e. line-neutral, line-ground and neutral-ground, by a circuit including three varistors connected to the line terminal and ground buses, as well as a light-emitting diode and an audio alarm which, respectively, provide visual and audio indications of the operative condition of the surge suppression means. The circuit components are mounted upon a printed circuit board providing the necessary electrical connections of the components. The printed circuit board has an external configuration designed to fit within a recess in the rear casing and, in the fully assembled condition is fully encased in an epoxy potting material.

In a preferred embodiment of the invention the transient voltage surge suppressor (TVSS) receptacle of the invention includes a switch blade having a generally U-shaped, metal switch blade for use with a switch of an electrical receptacle to repeatedly engage and disengage an electrical contact, the switch blade having a first leg for contacting the switch and having a distal end; a second leg acutely angled with the first leg for contacting the audible alarm contact in response to travel of the first leg caused by the switch, the second leg having a distal end extending beyond the distal end of the first leg; an integral U-shaped portion connecting the first and the second legs; and a non-linear intermediate portion in the second leg extending toward the first leg for absorbing over-travel of the switch blade.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
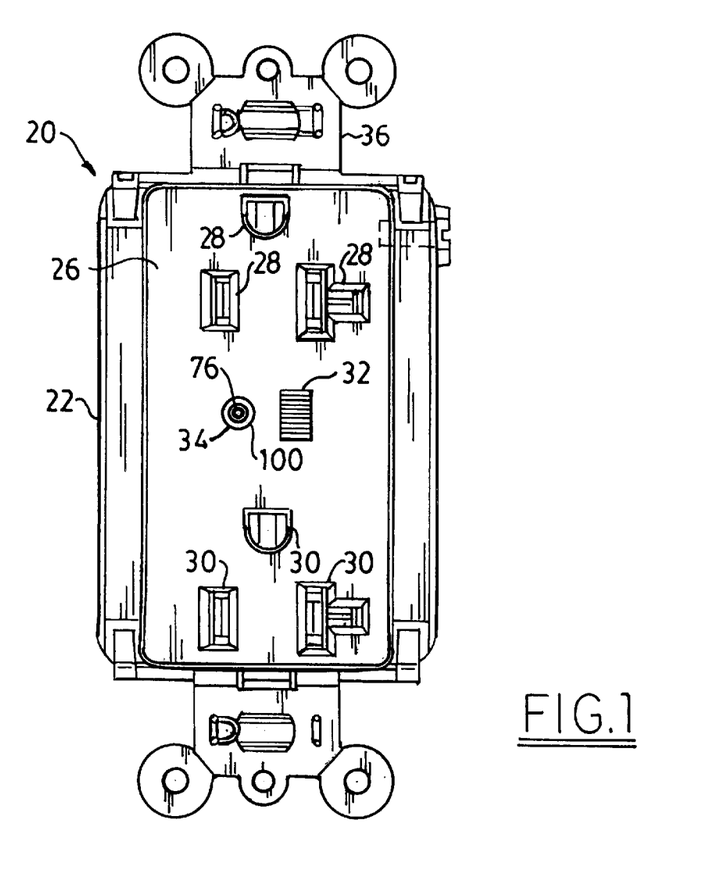
FIG. 1 is a top view of a fully assembled electrical receptacle.
Figure 2:
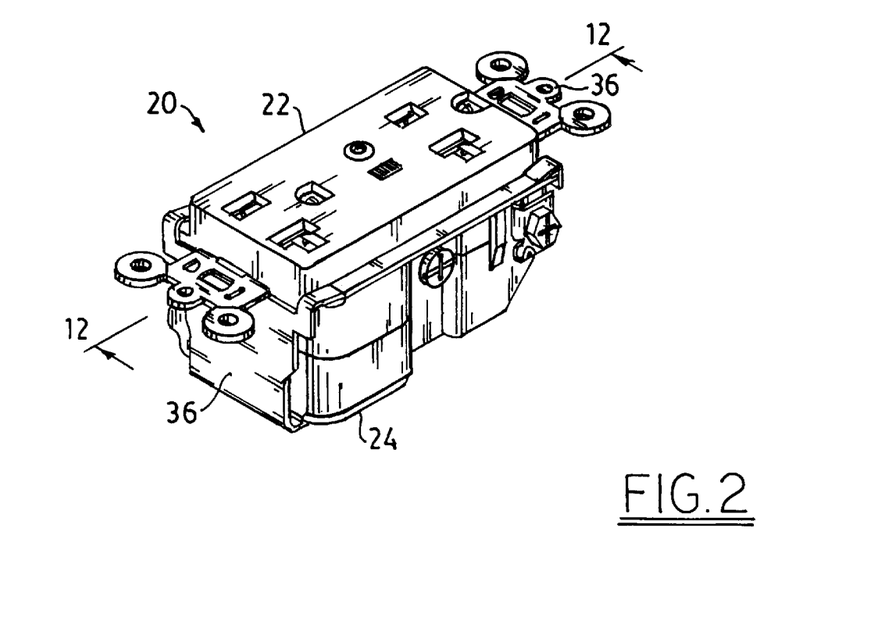
FIG. 2 is a perspective view of a fully assembled electrical receptacle seen from the upper side.

Referring now to the drawings a preferred embodiment of the receptacle is shown in FIGS. 1–2. The receptacle 20 includes front and rear casings 22 and 24, respectively, having cooperatively formed edge portions for mating engagement to provide an enclosed housing for the various components, as described below. Front casing 22 includes front wall 26 having two sets of openings 28 and 30 extending there through to receive prongs of a standard form of male plug in conventional fashion. One opening of each set is shaped and positioned to receive the plug grounded prong, and the other two openings are of different sizes to insure proper polarity when a plug having no grounding prong, but prongs of different widths for connection to the hot and neutral contacts of the receptacle is inserted therein. Also mounted in openings in front wall 26, between the two sets of openings 28 and 30, are a lens 32 and a push button switch 34 for purposes described later herein.

In addition to the enclosed housing formed by front and rear casings 22 and 24, receptacle 20 includes mounting strap 36 positioned entirely exteriorly of the housing.

Figure 3:
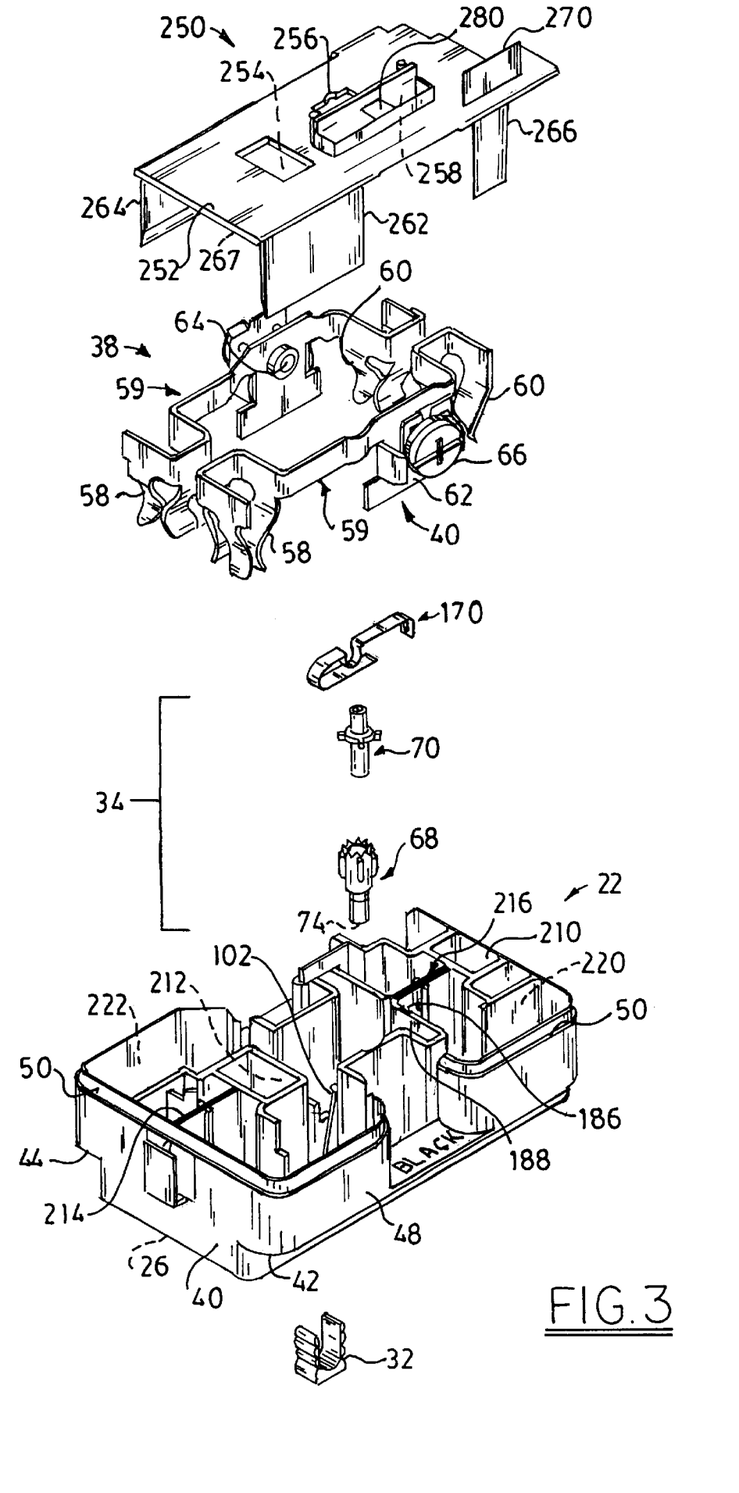
FIG. 3 is an exploded perspective view of the front casing of a receptacle showing the components and a separator board.
Figure 4:
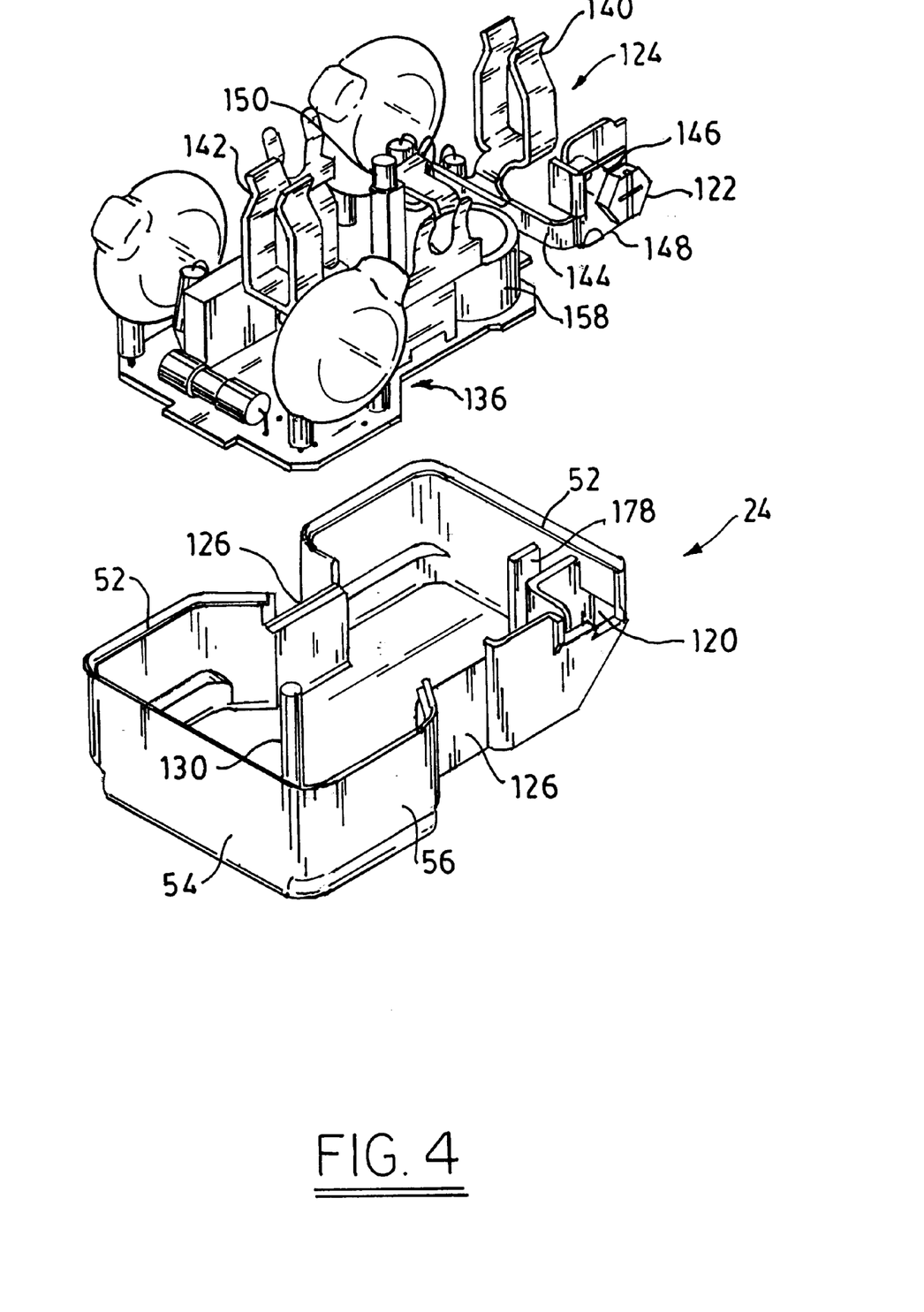
FIG. 4 is an exploded perspective view of the rear casing and the circuit board with the components mounted thereon.

Referring now to FIGS. 3 and 4, there are shown, separated from the receptacle 20, the front casing 22 and contact strips 38, 40 which fit into appropriately shaped recesses in front casing 22. Shoulders 42 and 44 extend along each side of front wall 26 of front casing 22. End wall 46 and side wall 48, as well as similar walls on the opposite end and side of front casing 22, include peripherally extending flange portions 50 for cooperative fit inside mating flanges 52 on end and side walls 54, 56, respectively of rear casing 24. It will be noted that side walls 48 of front casing 22 are not continuous, the discontinuities providing space for positioning the portions of contact strips 38, 40 to which the incoming electrical wires are attached.

Contact strips 38 and 40 are essentially identical, each being formed from a single piece of electrical conductor, stamped, punched and bent to the desired configuration. Each of contact strips 38 and 40 includes at opposite ends a pair of prong-receiving elements or contacts 58 and 60 comprising three flexible strips which are spread apart to resiliently but firmly engage the prong of an electrical plug inserted therein. The strip of metal 59 connecting contacts 58 and 60 includes a portion 62 having a threaded opening 64 for receiving screw 66 therein. When contact strips 38 and 40 are placed within the recesses provided therefor in front casing 22, portions 62 are positioned in the discontinuities in side walls 48, whereby the heads of screws 66 are accessible on the exterior of receptacle 20, as seen in FIG. 2, for attaching the line and neutral conductors of the electrical circuit in which receptacle 20 is included.

A push button switch 34 (FIGS. 1, 3 and 6) operates to deactivate an audible alarm which will be described in detail later. The push button switch 34 includes a button 68 and an actuator 70. The button 68 has a solid rod portion 72 with a dimple 74 recessed in one end and a tubular portion 76 extending from the opposite end. The tubular portion 76 has a greater diameter than the rod portion 72 and they are joined by a contiguous tapered portion 78. Four elongated ribs 80 are evenly spaced around the exterior surface of tubular portion 76 and extend from the distal end 82 part way toward the tapered portion 78. Protruding from the rim of the distal end 82 is a contiguous series of eight triangular-shaped teeth 84.

The button 68 cooperates with the actuator 70 to close a switch which will be described in detail later. The actuator 70 includes a rod 86, sized to slideably fit inside the tubular portion 76 of button 68. The rod 86 has a tapered end 88 with a flat surface and an opposite end 90 with a post 92 extending there from. Around the rod 86 and spaced from both ends 88, 90 is an annular collar 94 with upper and lower flat surfaces and a flat perimeter surface. Extending from the lower surface of collar 94 are eight evenly spaced triangular-shaped teeth 96, sized and shaped to mesh with the teeth 84 on the button 68 when the rod 86 is fully inserted into tubular portion 76. Also extending from the perimeter surface of collar 94 are four evenly spaced ribs 98 which are offset from ribs 80 when the sets of teeth 84 and 96 are meshed. The end of the button 68 with the dimple 74 is received in an aperture 100 (FIG. 1) of the front casing so that it is essentially flush with the front wall 26 when the sets of teeth 84 and 96 are meshed.

Figure 5:
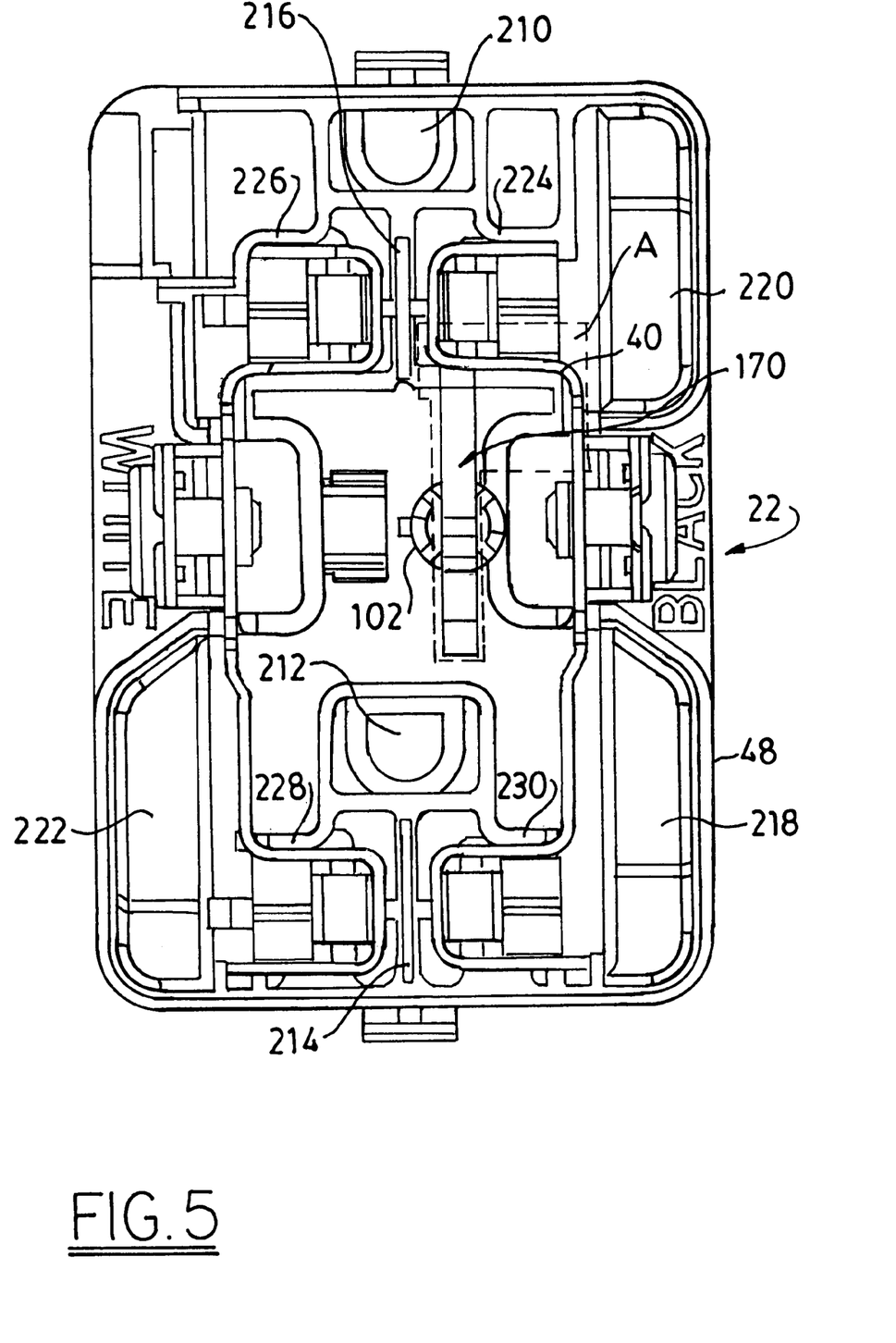
FIG. 5 is a rear elevational view of the front casing with components mounted therein.
Figure 6:
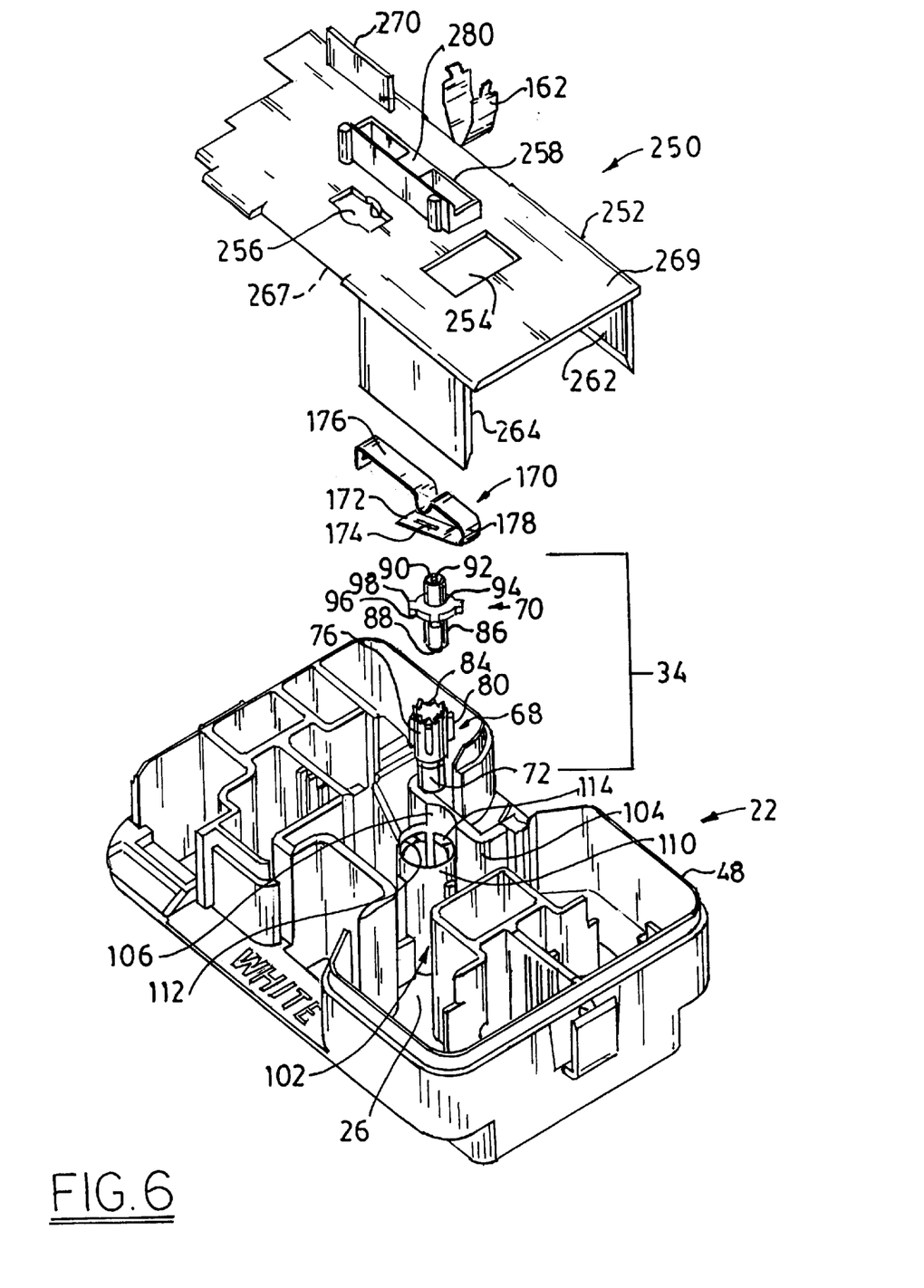
FIG. 6 is an exploded perspective view of the front casing of a receptacle showing the components and a separator board.

Included in the front casing 22 is an integral tower 102 for holding and cooperating with the push button switch 34. Referring to FIGS. 3, 5 and 6, one of the side walls 48 has a central portion 104 which includes a semi cylindrical recess 106 extending from the innermost edge of the side wall 48 toward the front wall 26 so that the recess 106 partially surrounds aperture 100 (FIG. 1). Extending up from the inside of the front wall 26 and surrounding the aperture 100 is the tower 102 so that a portion of the tower wall 110 extends partially along the length of the recess 106. The tower wall 110 has four evenly spaced grooves 112 extending from the top of the tower wall 110 part way down to the front wall 26. The grooves 112 are sized to slideably receive the ribs 80 of the button 68. The length of the grooves 112 is such that when the end with the dimple 74 of the button 68 is flush with the front wall 26 the ribs 80 of the button 68 are seated at the bottom of the grooves 112. Each of the four segments 114 of the tower wall 110 formed by the grooves 112 has a sloping upper edge divided into two curved steps of equal height which receive the ribs 98 of the actuator 70. As button 68 and actuator 70 are moved linearly away from front wall 26 (FIG. 1) and ribs 80 of button 68 and ribs 98 of actuator 70 are slideably captured by grooves 112 in tower wall 110, the intentional misalignment of the triangle shaped teeth 84 of button 68 and teeth 96 of actuator 70, along with opposing forces generated by outside mechanical actuation of button 68 and switchblade 170, impart a rotational force centered about the longitudinal axis of actuator 70. As ribs 98 of actuator 70 slideably exit grooves 112 of tower wall 110, aforementioned opposing forces cause teeth 84 of button 68 and teeth 96 of actuator 70 to align, therefore allowing rotation of actuator 70. As button 68 is moved linearly toward front wall 26 (FIG. 1) sloped undersides of ribs 98 of actuator 70 are allowed to contact curved steps of segments 114 in tower wall 110. Opposing force from switchblade 170 completes rotation of actuator 70.

The push-button switch is preferably made from a hard wearing plastic, such as a polycarbonate, for example Lexan 121R. The dimple 74 permits actuation of the switch by inserting a simple pointed tool, such as a pen or pencil tip, and capturing the tip in the recess of the dimple so that it is firmly engaged.

Figure 7:
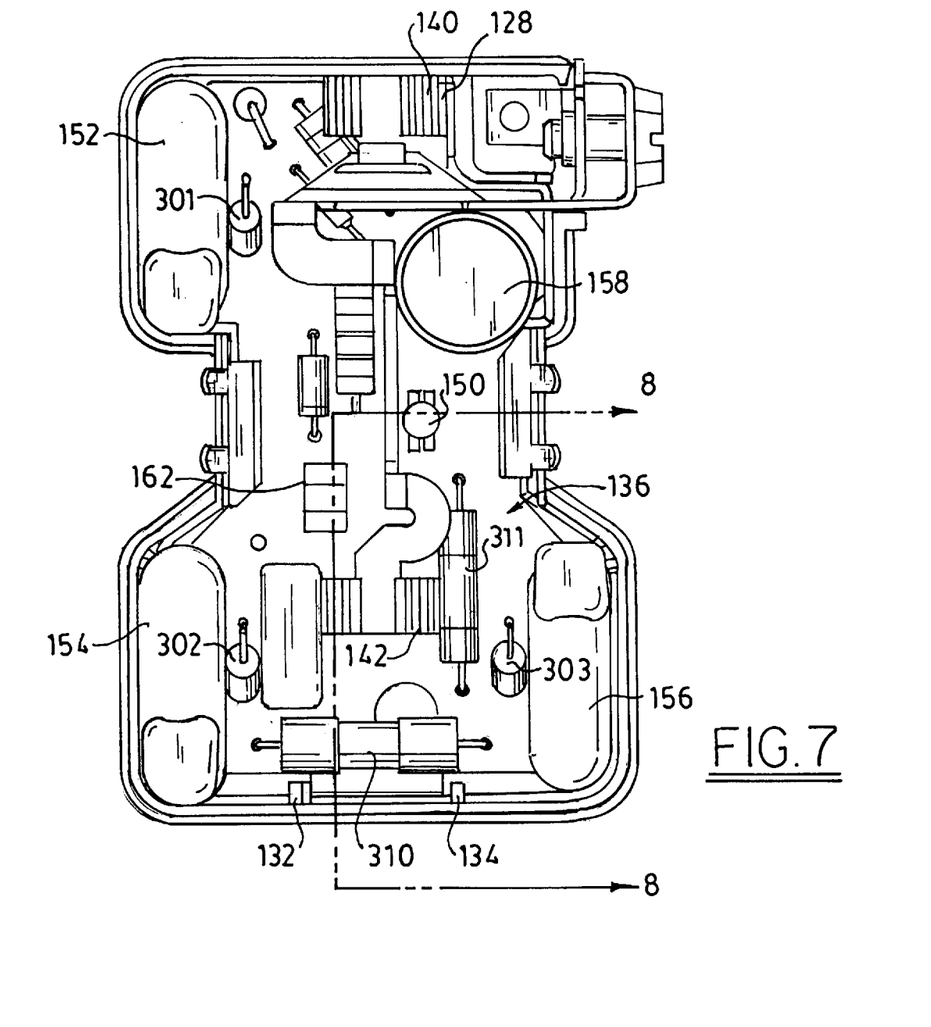
FIG. 7 is a front elevational view of the rear casing with components mounted therein.

The configuration of the rear casing 24, particularly its internal configuration, may best be seen with reference to FIGS. 4 and 7. End and side walls 54 and 56 extend continuously about the periphery of rear casing 24 and are of uniform height, except in area 120 where a portion is removed to expose screw 122 of ground bus 124. While end walls 54 are essentially planar and parallel to one another, side walls 56 are of irregular configuration in plan view, each having an inset portion 126 to conform to the configurations of side walls 48 of front casing 22. Wall portion 128 extends perpendicular from one of end walls 54 into the interior of rear casing 24, and is about three-quarters the height of the side and end walls. Post member 130 extends integrally from the inner surface into the interior of the rear casing, having a height substantially equal to that of wall 128. Rib members 132 and 134, having a height substantially equal to that of wall 128, extend perpendicularly from an end wall 54 opposite wall 128 into the interior of rear casing 24. The rear casing 24 is configured to receive a circuit board 136 which has openings and a perimeter configuration which allows the circuit board to be placed in the rear casing 24. Wall portion 128, post member 130 and rib members 132 and 134 extend above and/or through the circuit board to cooperatively support components of the circuit board.

Figure 8:
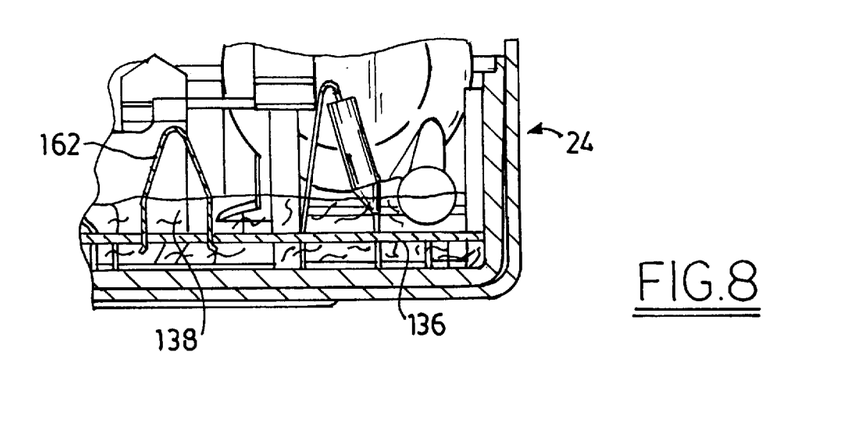
FIG. 8 is a partial side elevational view in section on the line 8—8 of FIG. 7.
Figure 9:
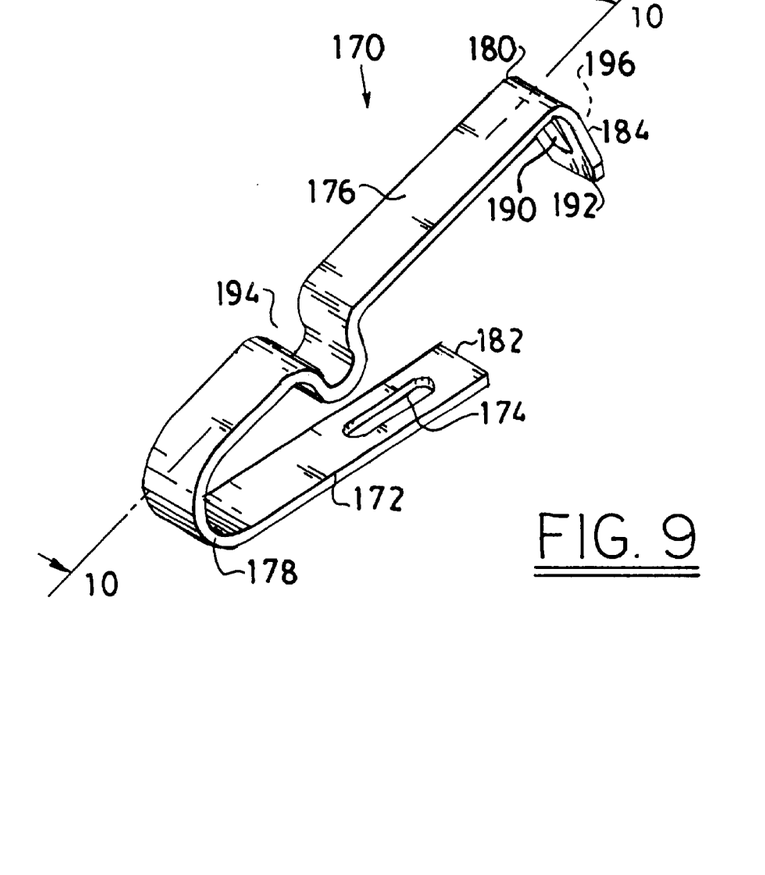
FIG. 9 is a perspective view of the switch blade.
Figure 10:
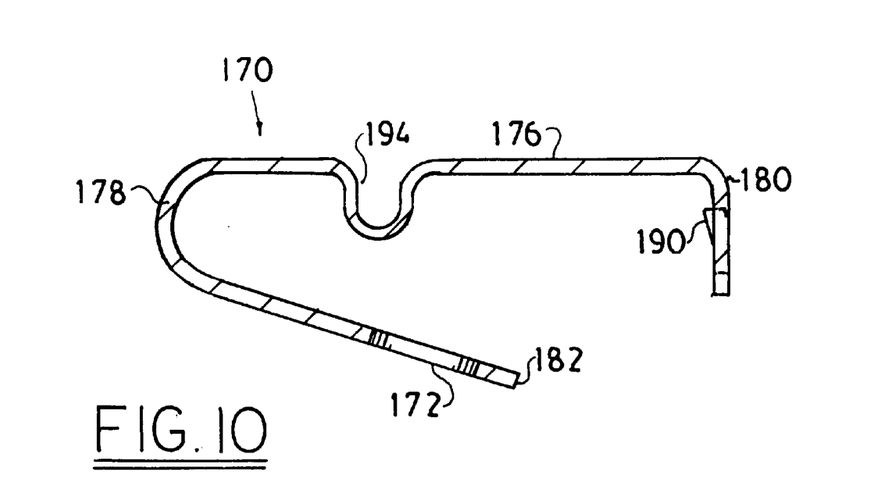
FIG. 10 is a side sectional view along the line 16—16 of FIG. 15.
Figure 11:
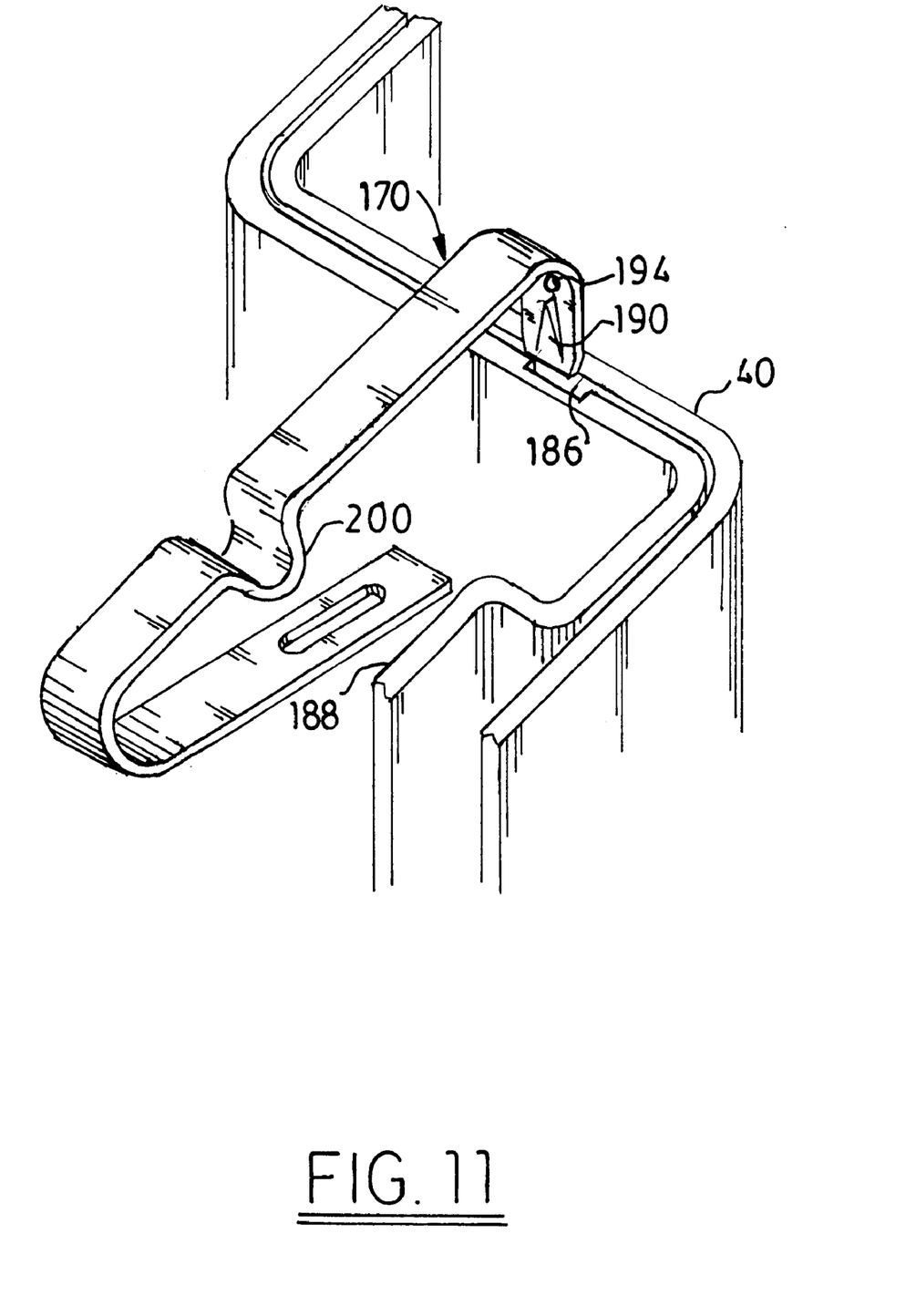
FIG. 11 is an enlarged perspective view of the area A of FIG. 5 showing the switch blade and the mounting notch in the front casing.

Referring now to FIGS. 4, 7 and 8, components of an electrical circuit providing transient voltage suppression in receptacle 20 are mounted within rear casing 24 on a circuit board 136 embedded in potting material 138. In addition to permanently fixing the circuit board and rear casing in predetermined relation, potting material 138 provides for isolation of components, improved thermal stability through heat sinking capability, improved thermal conductivity between components and preventing conduction between components due to high voltages. Also connected to the circuit board 136 is the ground bus assembly 124 having prong receiving elements or contacts 140 and 142, each comprising a pair of flexible strips which are spread apart by insertion there between of the ground prong of an electrical plug, strip 144 to which they are riveted or otherwise attached, and screw 122, received in threaded opening 146 in upturned tab 148 of strip 144. The screw 122 provides a ground connection with a metal junction box or ground wire.

Components of the circuit board 136 have leads that extend through holes in the circuit board 136 and are soldered to printed circuit traces formed on the back of the circuit board 136, the hot, neutral and ground terminal bus assembly also have pins that protrude through the circuit board that are attached to printed circuit traces on both sides of the board. Components having leads extending through circuit board 136 for inclusion in the circuit providing transient voltage protection to an apparatus plugged into receptacle 20 include resistors, capacitors, fuses, diodes, LED 150 and metal oxide varistor (MOV) devices 152, 154, 156 and audio alarm 158. In a desired construction, the fuses protect the apparatus in the event of failure of the varistor and the capacitor provides noise suppression in the circuit.

After assembly of all components and buses on circuit board 136, including all necessary soldering connections, is complete, the board assembly is placed in rear casing 24 which is first filled to a desired level with potting material 138 in liquid form. The corners of the circuit board are trimmed to permit the potting material to flow easily over the board as the latter is pushed downwardly into the liquid since the straight edges of circuit board 136 fit rather closely within the walls of the rear casing 24.

The leads from LED 150 extend through a plastic spacer 160 which provides a desired positioning of LED 150, i.e. a standoff or spacing from board 136, directly behind lens 32. The connection of LED 150 in the circuit is such that the LED is illuminated as long as the fuses 301, 302, 303, 310, 311 are operative. If any of MOV's 152, 154 or 156, which protect the line-ground, line-neutral, and neutral-ground pairs respectively, is rendered inoperative by a high transient voltage applied thereto, an associated overcurrent fuse 310 or 311 opens and LED 150 is extinguished. The fuse may be rated at, e.g. 5 amps. Additionally MOV's 152, 154 or 156 may begin to overheat, which may occur, for instance, at the end of their useful life or as a result of wiring errors or voltage supply anomalies. Overheating of MOV's 152, 154 or 156 will cause the opening of fuses 301, 302 and 303 respectively, and LED 150 is extinguished. These fuses may be rated at, for example 128° C. Any of fuses 301, 302, 303, 310, 311 opening provides a visual indication of the need to replace receptacle 20 in order to restore transient voltage protection. The use of LED's in this manner is conventional, as is the connection of the MOV's to provide clamping of the voltage to a safe level in all three modes, i.e. line-neutral, line-ground and neutral-ground.

A TVSS in accordance with this invention also provides an audible indication of a fault in either of the varistors 152, 154 protecting the line-ground and the line-neutral circuits. The connection of the audio alarm, such as a simple buzzer or piezoelectric device, in the circuit is such that the audio alarm is silent as long as MOV's 152, 154 are operative. If either of MOV's 152, 154 is rendered inoperative by a high transient voltage applied thereto, a fuse opens and the audio alarm is activated. This provides an audible indication of the need to replace receptacle 20 in order to restore transient voltage protection.

Figure 12:
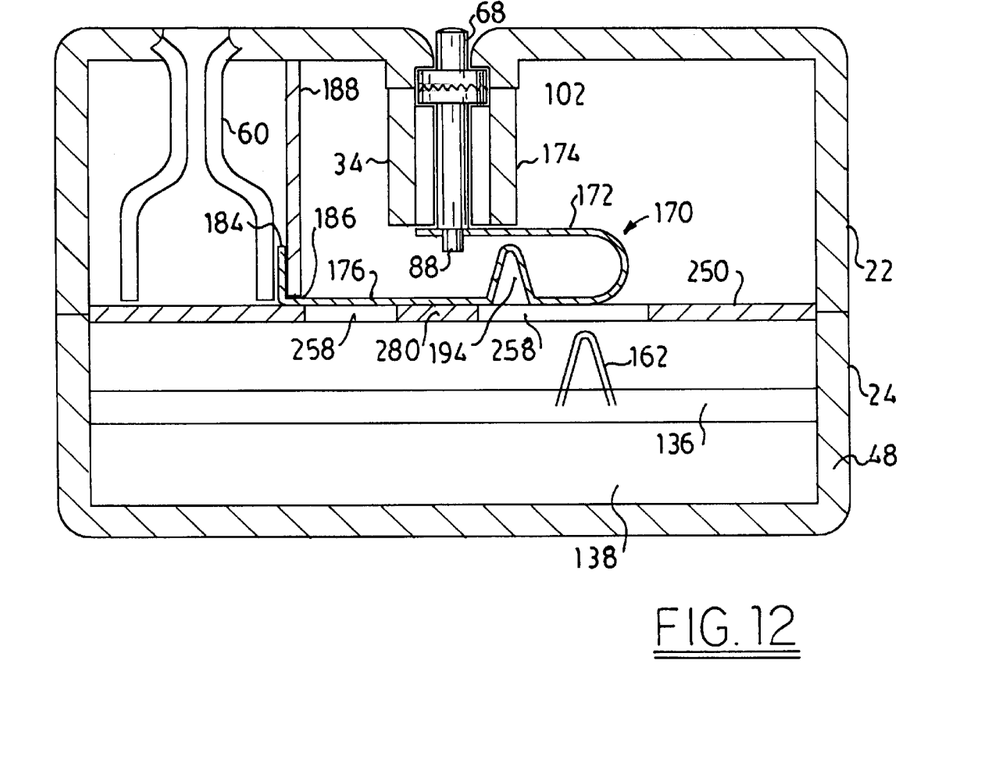
FIG. 12 is a partial sectional view along the line 12—12 of FIG. 2 showing the assembled switch blade and actuator.
Figure 13:
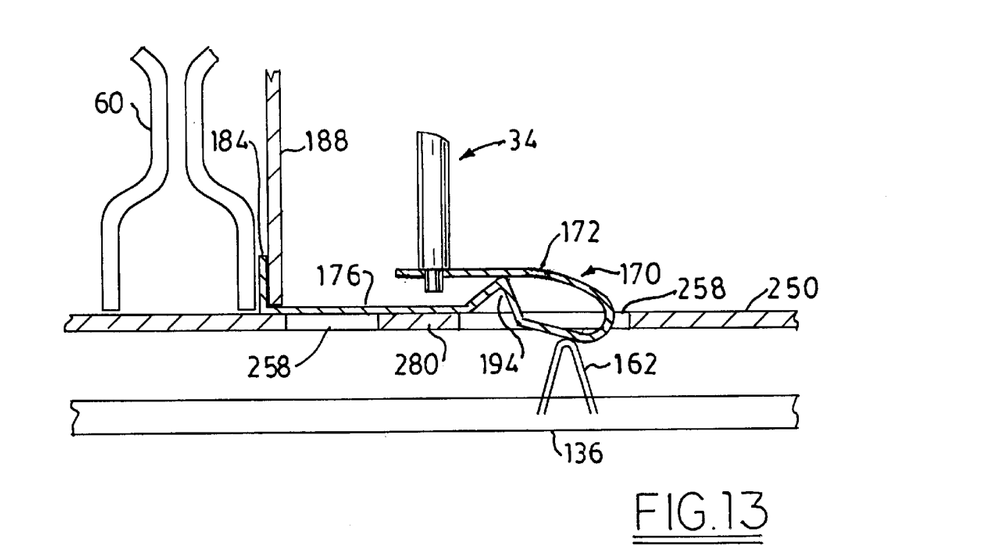
FIG. 13 is a partial view of the receptacle of FIG. 12 showing the assembled switch blade under pressure from the actuator.

In order to allow a user to deactivate the buzzer while awaiting repair, a normally open switch is connected to contact 162 so that when the switch is closed, current through the audio alarm 158 is shunted through the switch and the audio alarm is silenced (see FIGS. 7, 12 and 13). The deactivating switch is a simple normally open electrical switch, rather than a device that permanently deactivates the audio alarm or permanently interrupts a circuit trace. The switch, once closed, can be opened at will and the audio alarm activated. This is accomplished by combining the push button switch 34 described above with a switch blade for contacting contact 162 of the audio alarm circuit.

Referring now to FIGS. 3, 6, 9, 10 and 11, there is shown a switch blade 170, positioned directly in line with the actuator 70 for making and breaking the connection between the line contact strip 40 and an audio alarm circuit in response to movement of the actuator 70 by push button 68. The unstressed switch blade 170 is, preferably, a generally U-shaped metal switch blade which includes a flat first leg 172 with a slot or aperture 174 for receiving the post 92 of the actuator 70 therein and maintaining alignment of the blade 170 with the actuator. A flat second leg 176 of the blade 170 is integrally connected to the first leg 172 by a U-shaped portion 178 so that the second leg 176 is, preferably, in an acute angled relation to the first leg 172. The distal end 180 of the second leg 176 extends beyond the distal end 182 of the first leg 172. Projecting outwardly from the distal end 180 of the second leg 176 beyond the distal end 182 of the first leg 172 is a flat post 184 for contacting the prong receiving contact 60 of contact strip 40. The switch blade 170 is mounted to the front casing by inserting the post 184 into a notch 186 in a wall portion 188 of the front casing 22. The wall portion 188 is part of one of the recesses, formed in the front casing 22, for receiving the prong receiving contacts 60 of the line contact 40. The post 184, preferably includes a barb 190 on the inner surface 192 for gripping with the wall portion 188.

Pressure from the actuator 70 on the first leg 172 causes the switch blade 170 to flex about the post 184 and move the second leg 176 into contact with a contact 162 (FIGS. 12 and 13) of the audio alarm circuit. A description of the circuit is shown in co-pending application by Finlay et al., filed concurrently herewith and entitled TRANSIENT VOLTAGE SURGE SUPPRESSOR WITH THREE-WAY FAULT INDICATION, the disclosure of which is hereby incorporated by reference.

The overall travel of the switch blade 170 towards the contact 162 is limited by contact with features of a separator board which is described in detail below. As will be described later, during assembly of the TVSS, the angled second leg is stressed by features of the insulating separator so that in the fully assembled mode the second leg is held essentially parallel to the first leg when the audio alarm switch is open.

The switch blade 170 is constructed of a resilient metal, for example 0.020 inch thick CDA extra spring hard brass, that allows the first leg 172 of the switch blade to flex under pressure from the actuator 70 and travel in the direction of the second leg 176 of the switch blade while simultaneously moving the second leg 176 of the switch blade 170 against the contact 162. Repeated flexing and excessive travel of the first leg 172 can result in permanent deformation of the switch blade 170. In order to limit the length of travel of the first leg 172, a preferred embodiment of the switch blade 170 is provided with a loop 194 in the second leg 176 extending toward the first leg 172 and spaced from the distal end 180 of the second leg, so that the travel of the first leg 172 is limited by contact with the loop 194, without preventing the overall travel of the switch blade 170.

The U-shaped construction of the switch blade 170 provides a smoother feel during operation of the push button switch 34.

Referring now to FIGS. 3 and 5, the inner side of front casing 22 is seen to include interior wall portions within the recess formed by end and side walls 46 and 48 respectively, to provide appropriate spaces for various elements positioned therein. Interior recesses 210 and 212 accept ground prong receiving elements 140 and 142 respectively. The line contacts 38 and 40 are positioned in the discontinuities in side walls 48 and the prong receiving elements 58 and 60 of each line contact are separated from the other by interior wall portions 214 and 216 respectively. Each of recesses 218, 220 and 222 formed by shoulders 42 and 44 and side wall 48 receive one of the varistors 154, 152 and 156 respectively therein when the receptacle 20 is assembled. Additional interior wall portions 224, 226, 228 and 230 cooperate with the exterior end walls 46 to position and support the line contacts 38 and 40.

In order to insulate the line contacts 38, 40 housed in the front casing 22 from the electronic components of the circuit board 136 housed in the rear casing 24 when the TVSS receptacle is assembled a separator 250 is constructed which, when assembled between the front and rear casings 22, 24 respectively, provides an insulating barrier between the contacts and the electronic components, and thus allows the separation distances between the contacts and the components to be kept to a minimum. In addition features of the separator provide support for other components of the receptacle as will be described below.

Referring now to FIGS. 3, 6, 11, 12 and 13, there is shown a separator 250 including a flat insulating board 252 with generally rectangular apertures 254, 256 and 258 extending there through. Partitions 262, 264 and 266 extend vertically from the perimeter of a surface 267 of the board 252 facing the front wall 26 of the front casing 22, each partition being essentially the same height. Extending vertically from the opposite surface 269 of the board 252 and spaced from the perimeter of the board is a partition 270 having a height about one third of partition 264. The perimeter of the insulating board 252 is shaped to coincide with and be supported by corresponding wall portions of the front casing when the separator is assembled with the front casing.

Rectangular aperture 254 is positioned to cooperatively receive the ground prong receiving contact 126.

Rectangular aperture 258 is positioned to cooperatively receive the switch blade 170. The rib 280 is positioned to contact the switch blade second leg 176 as the portion of the second leg between the loop 194 and the U-shaped end 178 extends through the aperture 258 to contact the contact 162 and thus prevents over travel of the switch blade 170.

The separator is typically molded from a rigid, heat resistant plastic material such as nylon, for example nylon 6 or a fiber glass reinforced nylon.

The switch blade of the invention having an integral over-travel stop prevents permanent deformation of the switch blade after repeated operations and is more reliable than known switch blades.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A transient voltage surge suppressor (TVSS) receptacle comprising:

front and rear, matable casings having respective front and rear walls, said casings when in mated relation defining an enclosed space;

an electrical circuit within the receptacle having at least one element adapted to clamp high transient voltages imposed thereon to a lower level;

an alarm electrically connected to the at least one element for indicating the failure of the at least one element; and a switch connected to the alarm for disabling the alarm, the switch comprising:

a moveable on-off element; and a generally U-shaped, metal switch blade comprising:

a first leg for contacting the moveable element and having a distal end;

a second leg for contacting a contact of the alarm in response to travel of the first leg caused by the moveable element, the second leg having a distal end extending beyond the distal end of the first leg;

an integral U-shaped portion connecting the first and the second legs; and a non-linear intermediate portion in the second leg extending toward the first leg for absorbing over-travel of the switch blade.

2. The receptacle of claim 1, in which the switch blade further comprises a post projecting outwardly from the distal end of the second leg for mounting the blade to the receptacle and contacting a line terminal of the receptacle.

3. The receptacle of claim 2, in which the post further comprises a barb for gripping with the receptacle.

4. The receptacle of claim 1, in which the first leg further comprises a feature for locating the moveable element.

5. The receptacle of claim 4, in which the feature is an aperture.

6. The receptacle of claim 1, in which the second leg is acutely angled with the first leg.

7. The receptacle of claim 1, in which the non-linear intermediate portion is generally U-shaped.

* * * * *